(12) United States Patent
Lemelin et al.

(10) Patent No.: US 8,150,145 B2
(45) Date of Patent: Apr. 3, 2012

(54) APPARATUS AND AUTOMATED MANUFACTURING DEVICE FOR PRODUCING A PERSONALIZED 3D OBJECT

(75) Inventors: Guylain Lemelin, Sainte-Foy (CA); Sonya Delisle, L'Ancienne-Lorette (CA); Dominique Beauchamp, Saint-Nicolas (CA)

(73) Assignee: CNCA Laser Co. Ltd., Anhui (CN)

( * ) Notice: Subject to any disclaimer, the term of this patent is extended or adjusted under 35 U.S.C. 154(b) by 44 days.

(21) Appl. No.: 12/772,061

(22) Filed: Apr. 30, 2010

(65) Prior Publication Data

US 2010/0332005 A1 Dec. 30, 2010

Related U.S. Application Data

(63) Continuation-in-part of application No. 11/340,401, filed on Jan. 26, 2006, now abandoned.

(60) Provisional application No. 60/646,987, filed on Jan. 27, 2005.

(51) Int. Cl.
*G06K 9/00* (2006.01)
*G06F 17/00* (2006.01)
(52) U.S. Cl. ......................... 382/154; 700/233
(58) Field of Classification Search .................. None
See application file for complete search history.

(56) References Cited

U.S. PATENT DOCUMENTS

| | | | | |
|---|---|---|---|---|
| 4,558,802 A * | 12/1985 | Molison | ........................... | 221/11 |
| 4,949,526 A * | 8/1990 | Brogna et al. | ................... | 53/306 |
| 5,000,345 A * | 3/1991 | Brogna et al. | ..................... | 221/5 |
| 5,242,080 A * | 9/1993 | Kroon et al. | ................... | 221/113 |
| 5,551,596 A * | 9/1996 | Oomori | ........................ | 221/113 |
| 6,085,195 A | 7/2000 | Hoyt et al. | | |
| 6,370,841 B1 * | 4/2002 | Chudy et al. | .................... | 53/411 |
| 6,480,673 B2 | 11/2002 | Liebenow | | |
| 6,481,180 B1 * | 11/2002 | Takahashi et al. | .............. | 53/237 |
| 6,493,095 B1 | 12/2002 | Song et al. | | |
| 6,605,797 B1 | 8/2003 | Troitski | | |
| 6,630,644 B2 | 10/2003 | Troitski et al. | | |
| 6,664,531 B2 | 12/2003 | Gartner et al. | | |
| 6,668,210 B1 * | 12/2003 | Kim et al. | ...................... | 700/235 |
| 6,718,123 B1 | 4/2004 | Massarsky | | |
| 6,915,008 B2 | 7/2005 | Barman et al. | | |

FOREIGN PATENT DOCUMENTS

CA 2435935 A1 1/2005

OTHER PUBLICATIONS

InSpeck, Inc. website, http://www.inspeck.com/products/crystal/crystal.asp and linked video files, as archived by The Internet Archive, http://www.archive.org/. on Dec. 19, 2003.

* cited by examiner

*Primary Examiner* — Bhavesh Mehta
*Assistant Examiner* — Barry Drennan
(74) *Attorney, Agent, or Firm* — Knobbe Martens Olson & Bear LLP

(57) ABSTRACT

An apparatus for producing a personalized 3D object is disclosed. The apparatus, or kiosk, comprises a payment detector, a user input device and a display, an image acquisition system, calculators for calculating a 3D image, a manufacturing device and an exit for delivering the personalized 3D object to the user. The manufacturing device includes a loading device for loading blank 3D objects on a platform, which includes vertical storages and a rotatable tray disposed underneath having a slit therein for receiving the blank 3D objects. The rotatable tray is computer controlled to rotated between various operative positions for loading and unloading the 3D objects.

7 Claims, 11 Drawing Sheets

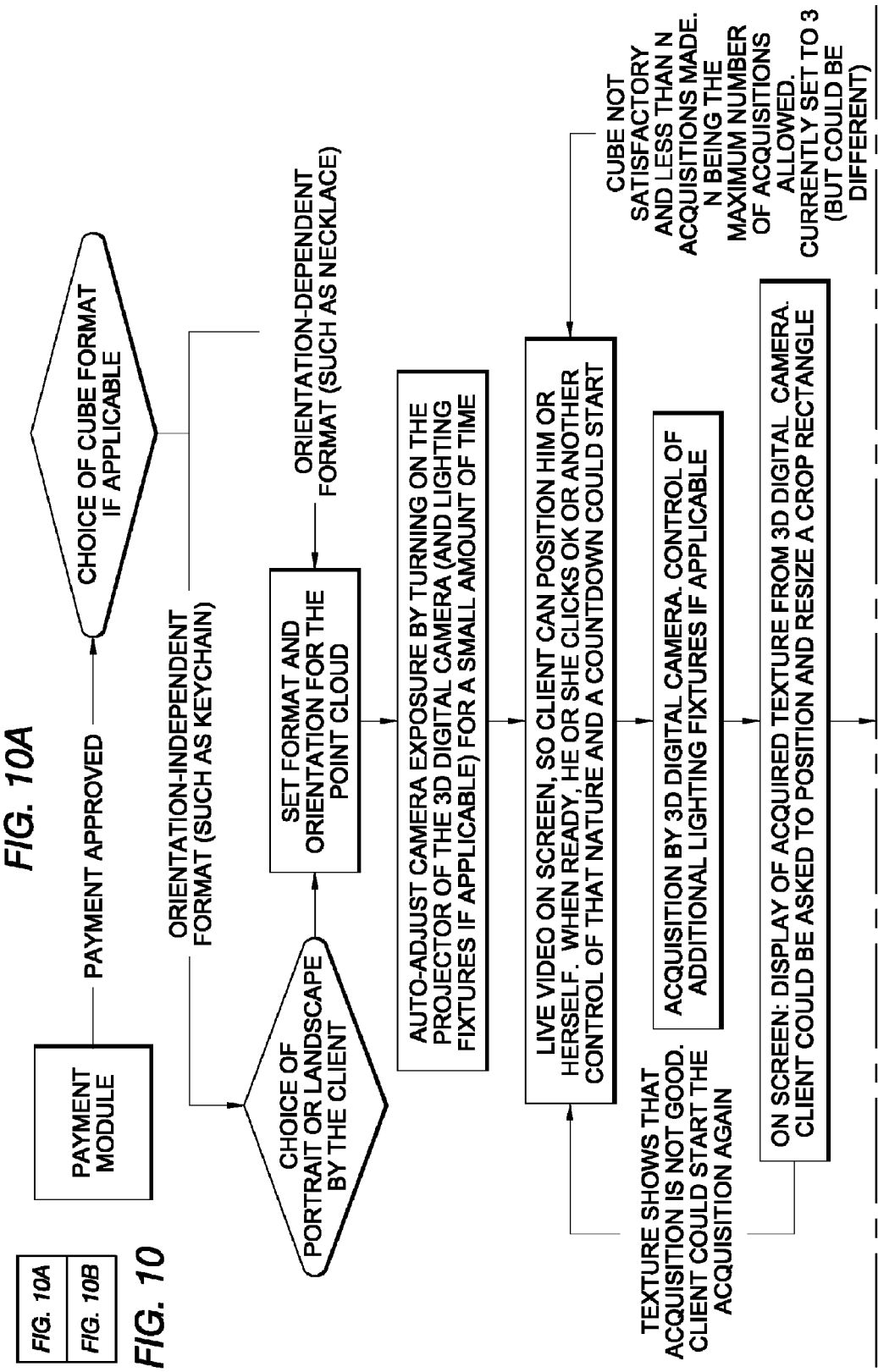

APPARATUS AND AUTOMATED MANUFACTURING DEVICE FOR PRODUCING A PERSONALIZED 3D OBJECT

CROSS REFERENCE TO RELATED APPLICATIONS

This application is a continuation-in-part of U.S. patent application Ser. No. 11/340,401, titled "APPARATUS AND METHOD FOR PRODUCING A PERSONALIZED 3-D OBJECT BY OBTAINING 3-D IMAGES OF A SUBJECT," filed Jan. 26, 2006, now abandoned, which claims priority under 35 U.S.C. §119(e) from U.S. Provisional Application No. 60/646,987, filed Jan. 27, 2005, which are both hereby incorporated by reference in their entirety.

BACKGROUND

1. Field

The disclosed technology relates to a method and apparatus to produce a personalized 3D object, such as photo vending machines hereafter named photo kiosks.

2. Description of Related Technology

Photo kiosks were invented in 1925 by a Siberian named Anatol Josepho. These machines could take affordable portraits anonymously and automatically.

The popularity of photo kiosks has been uneven throughout the past eighty years. In their first 20 years, photo kiosks have had an explosive growth due largely to World War II, as soldiers and loved ones exchanged pictures. Later on, with the advent of the Polaroid and personal cameras, photo kiosks became less popular.

Today, with the coming of digital photography, new possibilities are offered to customers who can apply effects and make several types of modifications to pictures before printing them not only on photo paper, but on several different mediums such as, for example, photo stickers. Customers are thus regaining interest in photo kiosks.

Some attempts were made in the past to sell personalized 3D images in crystals using 3D sub surface laser engraving (SSLE) application technology. As a matter of fact, these attempts have had limited success because the early attempts were not profitable. Several limitations to profitability were encountered such as high initial investment, high operations costs because of the need to have a salesperson. For SSLE shop owners, there was no other alternative than to increase the price of each crystal unit to cover the expenses. Higher prices turned customers off the products, as the majority of them are not willing to pay premium prices even thought they are interested in the product.

Thus, there is a need for a way to produce a personalized 3D object and deliver it to a customer without the aid of a salesperson.

SUMMARY OF CERTAIN INVENTIVE ASPECTS

In accordance with one aspect, there is provided an automated manufacturing device for producing a personalized 3D object in a blank 3D object in view of a set of 3D data and of parameters selected by a user. The device includes:
   a platform for receiving the blank 3D object;
   a sub-surface laser engraver for altering the blank 3D object on the platform in view of the set of 3D data and the parameters selected by the user, thereby producing the personalized 3D object;
   a delivering device for delivering the personalized 3D object to the user; and
   a loading device for loading a blank 3D object onto the platform, the loading device including:
      At least one vertical storage for storing a plurality of the blank 3D objects in a vertically stacked arrangement, each vertical storage having a bottom opening allowing a lowermost one of the blank 3D objects in the vertical storage therethrough; and
      A rotatable tray disposed underneath the vertical storage obstructively of the bottom opening, the rotatable tray having a slit therein sized to receive the lowermost one of the blank 3D objects from the vertical storage. The tray is computer controlled to rotate between an object-receiving position where the slit is aligned with the bottom opening of one of the at least one vertical storage to receive the lowermost one of the blank 3D objects therein, a loading position where the slit is positioned over the platform to load the blank 3D object thereon, and a delivering position where the slit collaborates with the delivering device.

In accordance with another aspect, there is also provided an apparatus for producing a personalized 3D object, including:
   a payment detector configured to detect whether a payment has been received;
   a user input device and a display configured to allow a user to select parameters within a bank of parameters when a payment is received;
   an image acquisition system configured to capture at least two images of a subject in view of the parameters selected by the user;
   a first calculator configured to calculate a 3D image of the said at least two images captured;
   a second calculator configured to extract a set of 3D data from the 3D image; and
   an automated manufacturing device as described above.

The various aspects and advantages will be better understood upon reading the following non restrictive description of inventive embodiments made with reference to the accompanying drawings.

DETAILED DESCRIPTION OF VARIOUS INVENTIVE EMBODIMENTS

Figure 1:
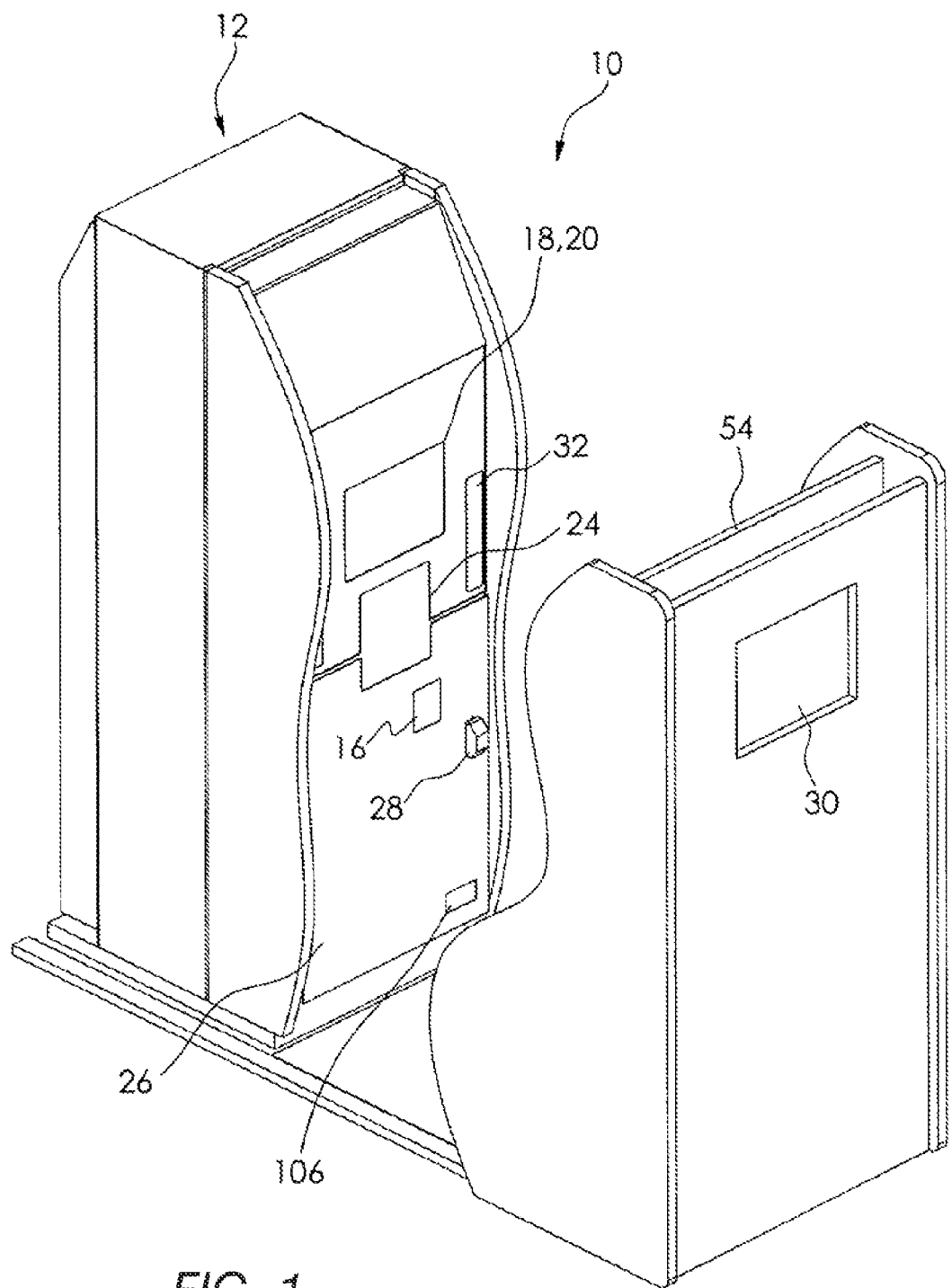
FIG. 1 is a perspective front view of a photo kiosk according to one embodiment.

Referring now to FIGS. 1 to 8 there is shown an apparatus 10 according to some embodiments. More specifically, the apparatus is a kiosk including an optical 3D imaging device where a user can have his face, bust, or any other object captured in a 3D digital form with a color overlay. After some processing, the 3D images representing the subject can be engraved by a sub-surface laser engraver 90 within a crystal.

The apparatus 10 comprises a payment detector 16 for detecting whether a payment has been received and a user input device 20 and a display 18 for allowing a user to select parameters within a bank of parameters when a payment is received. The apparatus also comprises an image acquisition system 50 for capturing at least two images of a subject in view of the parameters selected by the user. In some embodiments, the image acquisition system 50 has a projector for projecting a pattern unto the subject and a camera 60 to acquire four images. In some embodiments, the projector and the camera 60 are set up in such a way as to offer an extended non-ambiguity zone. The apparatus 10 also comprises a calculator 80 for calculating a 3D image with the at least two images captured and a calculator 80 for extracting a set of 3D data from the 3D image.

The apparatus 10 also comprises a manufacturing device for producing the personalized 3D object in view of the set of 3D data and the parameters selected by the user and an exit 106 for delivering the personalized 3D object to the user. In some embodiments, the manufacturing device comprises a platform 94, a loading device 98 for loading a blank 3D object onto the platform, an altering device for altering the blank 3D object in view of the set of 3D data and the parameters selected by the user, and to produce the personalized 3D object. In some embodiments, the blank 3D object is made of optical glass, and the altering device is a sub surface laser engraver 90. In some embodiments, the manufacturing device comprises a delivering device 104 for delivering the personalized 3D object to the user via the exit 106.

In some embodiments, the apparatus 10 also comprises a panel of a uniform color facing the image acquisition system 54.

Figure 3:
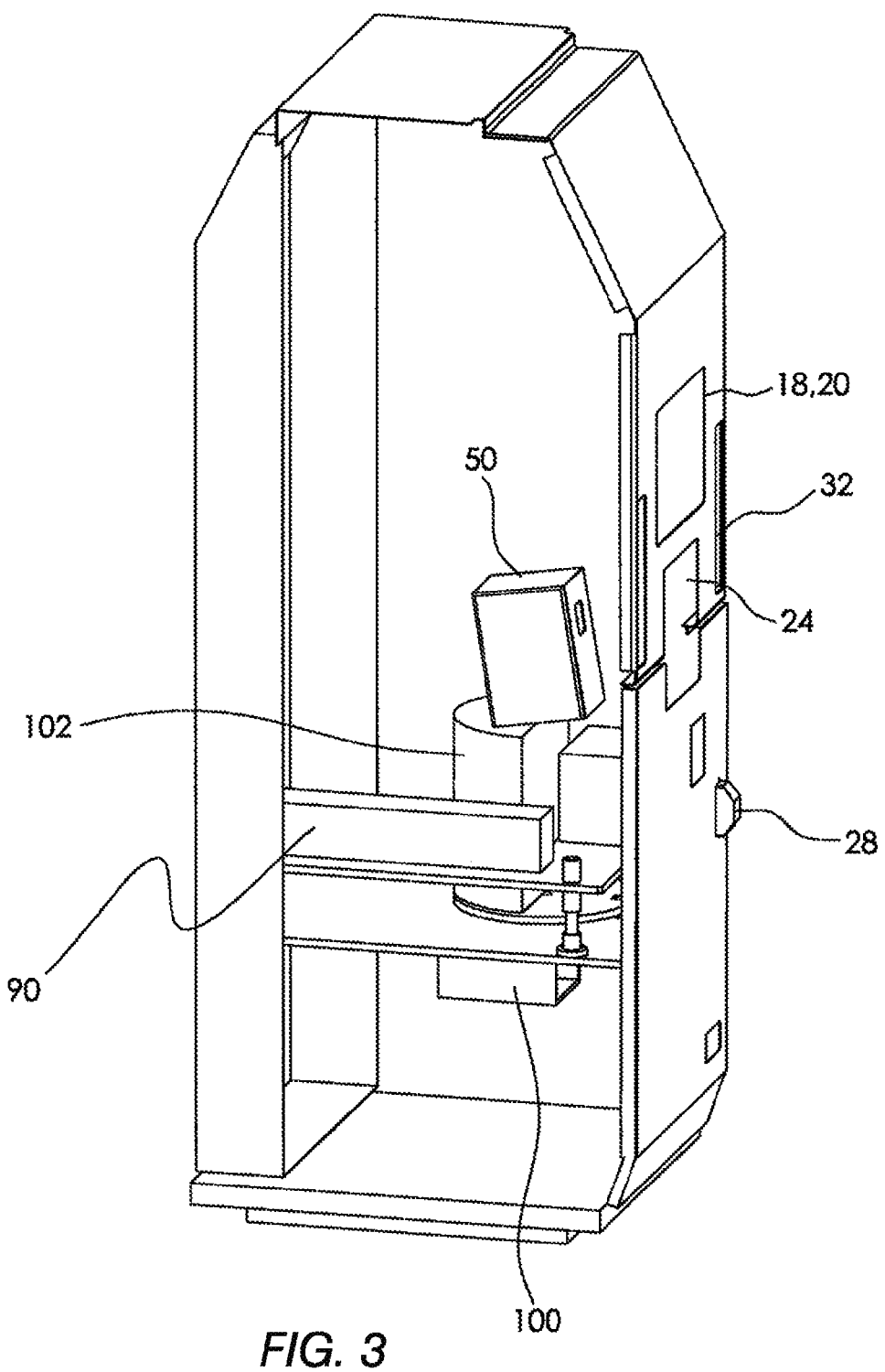
FIG. 3 is a perspective left side view of internal parts of the main enclosure of the photo kiosk shown in FIGS. 1 and 2.
Figure 4:
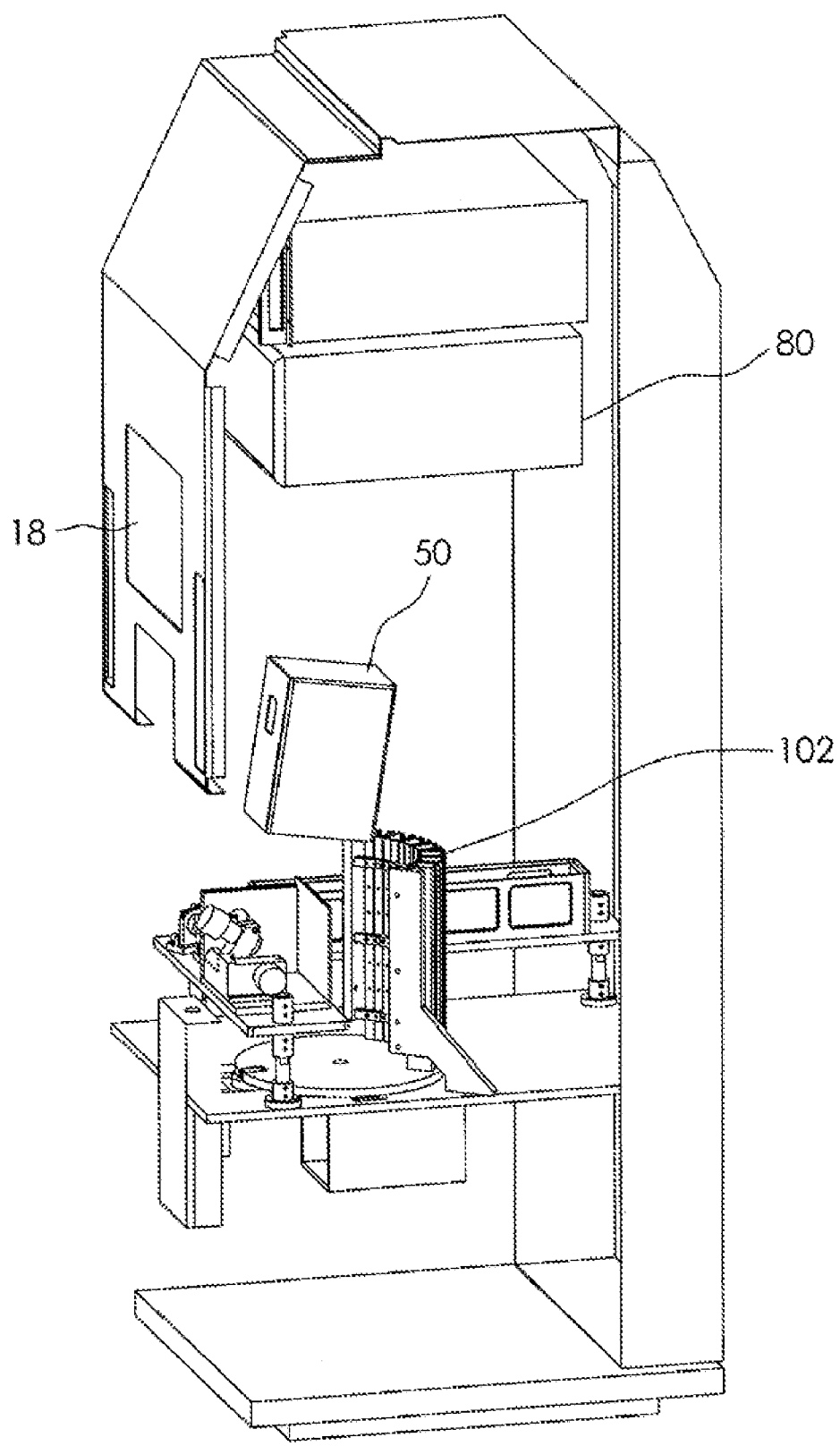
FIG. 4 is a perspective right side view of internal parts of the main enclosure of FIGS. 1 to 3.
Figure 5:
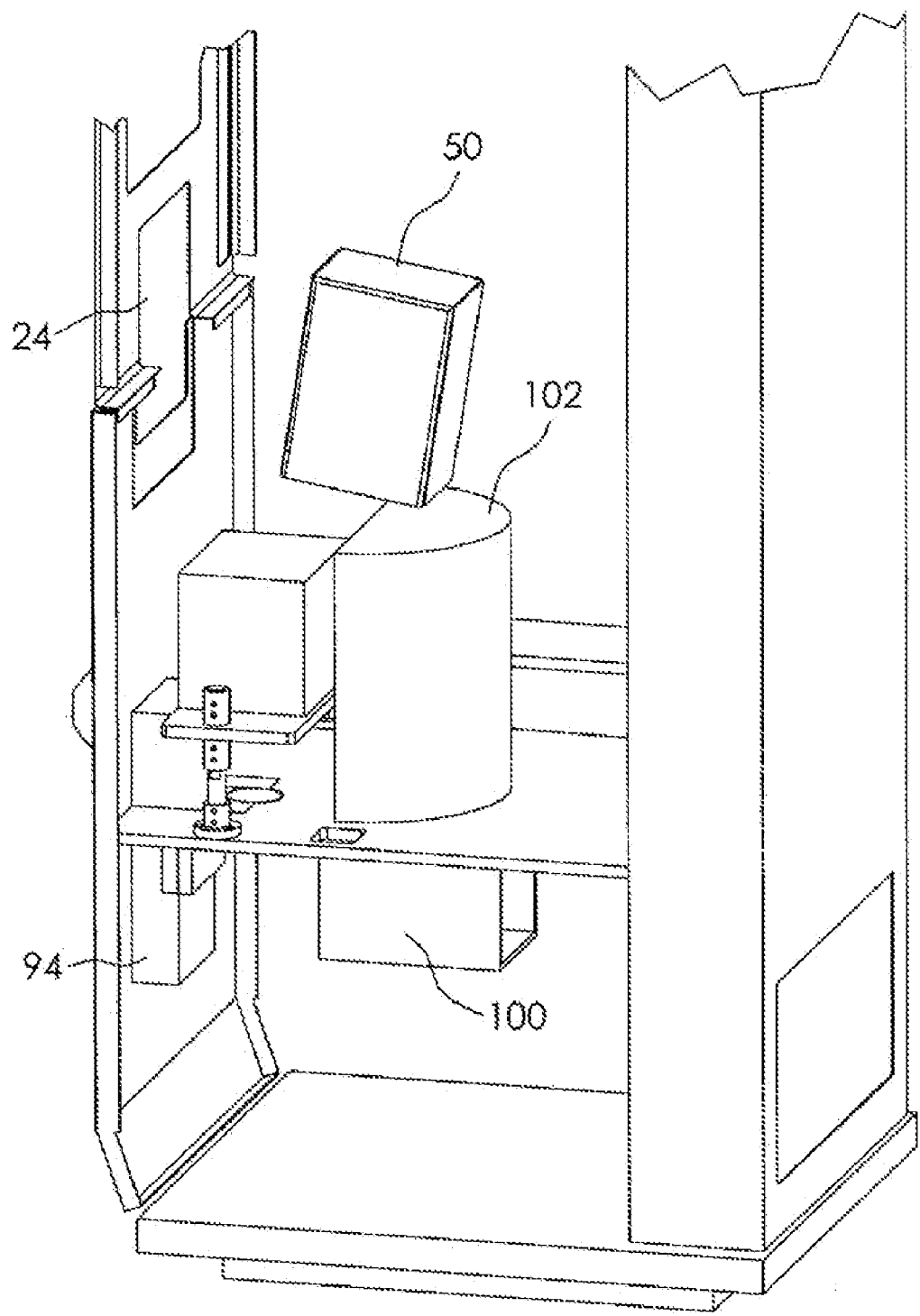
FIG. 5 is a partial rear and right side perspective view of internal parts of the main enclosure shown in FIGS. 1 to 4.

Now referring to FIGS. 1, 3 and 4 the apparatus 10 is a photo kiosk similar to a standard photo vending machine, but its shape may vary. In the embodiment shown, there is a front door 26 with a door handle 28 which gives access to the components inside the main enclosure 12 of the kiosk. The kiosk comprises a display 18 connected to the main computer 80. This display 18 may be used to show all the instructions and controls intended for human interaction done by the user but could also show various other materials that could be used for the self-promotion of the kiosk or its derived products. In the embodiment shown, the display 18 is a flat Liquid Crystal Display (LCD) touch screen monitor and thus it is also the user input device 20. In another embodiment, the user input device 20 could be a keyboard or a remote control with mechanical buttons or any other kind of input device. The computer 80 controls all the main components of the kiosk and is provided with a network or interne connection, either wireless or cable, to transfer the acquired 3D data to a server for later purposes. The kiosk can also be provided with a secondary display 30 connected to the computer 80, and positioned outside the kiosk for marketing purposes.

The kiosk comprises a window 24 behind which is positioned the image acquisition system 50. It also comprises a payment detector 16 linked to a computer 80, not necessarily the main computer 80, for managing information pertaining to credit information. The exact nature, position, shape and capabilities of the payment detector 16 are expected to change depending on marketing approaches, physical layout and design of the kiosk, or physical location of the kiosk. The kiosk comprises an exit 106 where the crystal cube is delivered once engraved. Additional illumination 32 can also be present, but is not mandatory, on each side of the window 50. The back side of the kiosk may comprise a secondary display 30, which is may be a flat LCD monitor, for marketing purposes.

Figure 2:
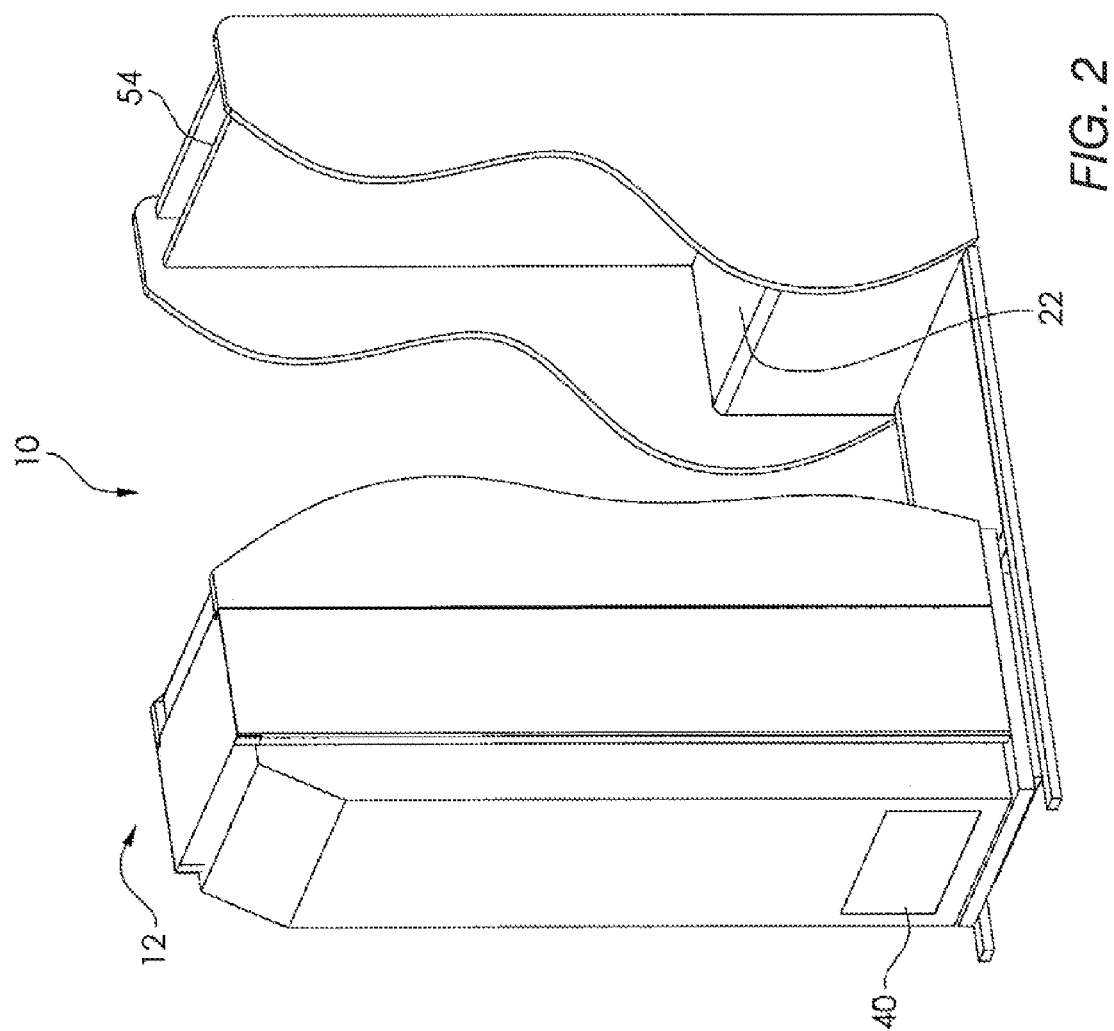
FIG. 2 is a perspective rear view of the photo kiosk shown in FIG. 1.

Now referring to FIGS. 2 to 4, there is an optional cooling vent 40 part of a cooling system that might be required to eliminate heat produced by the laser 90. The kiosk may offers a bench 22 where the subject is expected to sit or be deposited. The bench 22 is positioned at the proper distance, within the extended non-ambiguity zone, from the image acquisition system 50, for optimal quality of the 3D images. This distance is expected to change if the internal configuration of the image acquisition system 50 changes. If a bench 22 is present in the kiosk, the space under it can be used for storage of a computer 80, whether the one controlling the main components of the kiosk, the main computer 80, or any other necessary computer. Otherwise, this space could be used for general storage purposes. In some embodiments, a panel 54 made of a uniform color is part of the kiosk, for example, blue. The panel 54 can be made of cloth, plastic or any other materials, and may be used for background recognition by the 3D background extraction algorithms.

Now referring to FIGS. 1 and 3 to 7, the main enclosure 12 comprises an image acquisition system 50 and optionally a cooling system comprising a fan 44, a water reservoir 46 and a pump 42. A manufacturing device is also optionally present in the main enclosure and comprises cube storage 102 to insure the proper storage of all the cube formats that are offered for engraving, a platform 94, a loading and unloading device 98 for loading, unloading and positioning the crystal cubes onto the platform 94 near the laser for the engraving, the platform sliding up and down as the cube is being engraved, a drop chute 104 and motors for cube displacement 100 for delivering the cubes in the exit 106 outside the kiosk. The manufacturing device may further comprise a laser 90 and laser optical components 92, as required for sub-surface engraving. These components should not be limiting and the exact shape, size, number, layouts, functionalities and positions will depend on the kiosk layout, the types of cubes being engraved, the power required by the laser, or other factors. The manufacturing device of some embodiments is designed to handle a small number of only one type of cube. It is understood that this manufacturing device cannot be limited to this particular design and that designs able to manipulate many different forms and sizes of cubes could be used.

Figure 6:
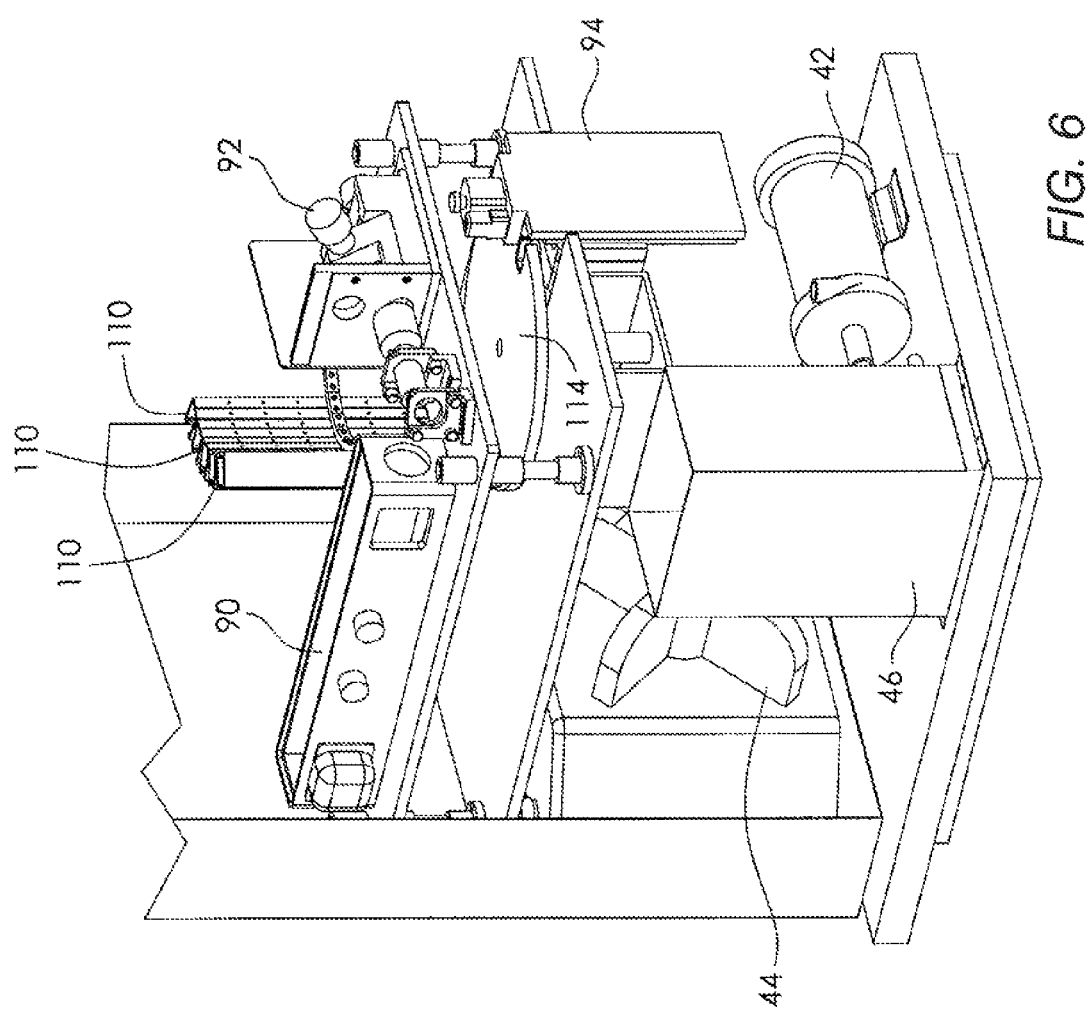
FIG. 6 is a partial front perspective view of internal parts of the main enclosure shown in FIGS. 1 to 5.
Figure 7:
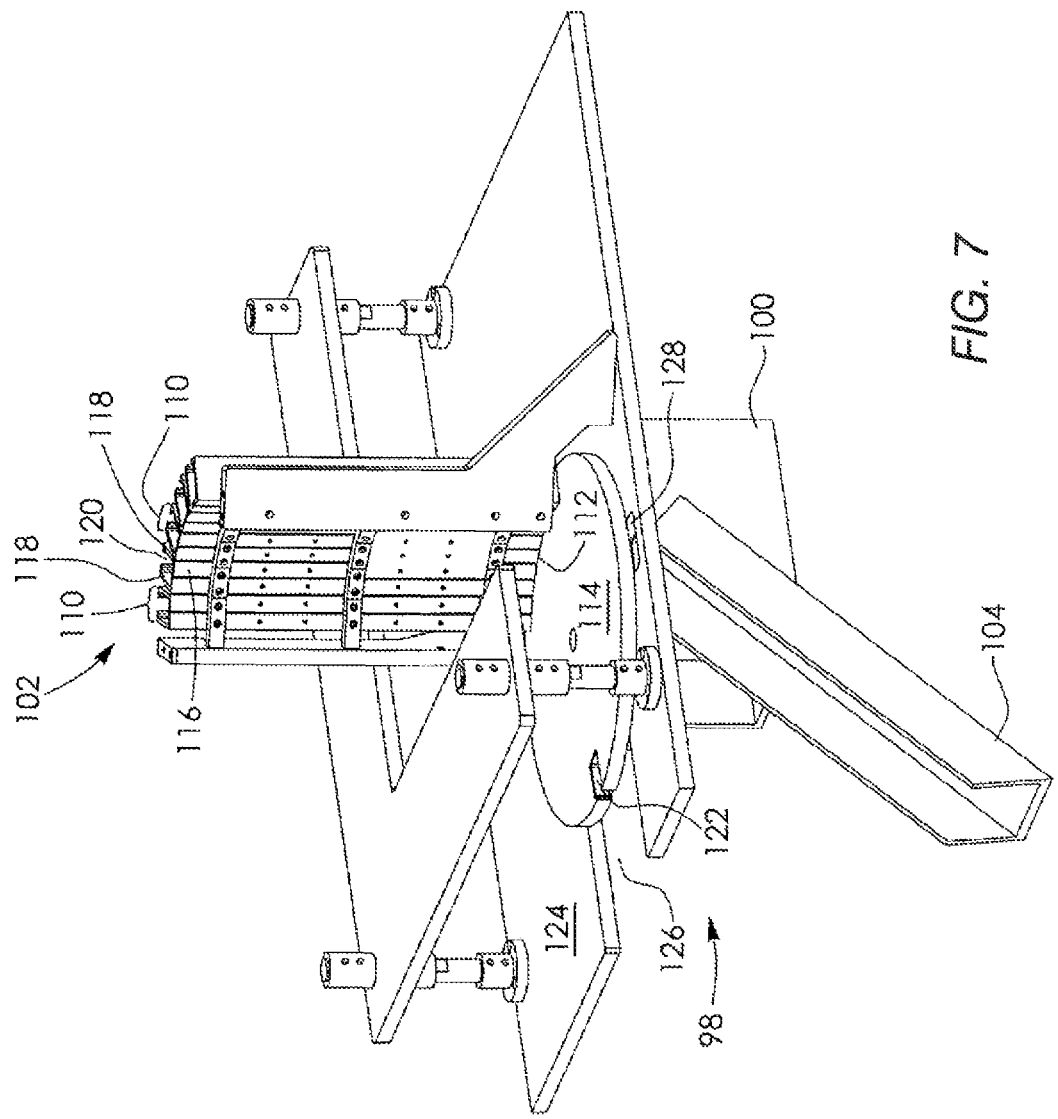
FIG. 7 is a perspective view of internal parts of the main enclosure shown in FIGS. 1 to 6.

Referring more particularly to FIGS. 6 and 7, in one embodiment the cube storage 102 is embodied by one or more vertical storages 110 which each store a plurality of the blank 3D objects in a vertically stacked arrangement. Each vertical storage has a bottom opening 112 allowing the lowermost one of the blank 3D objects stored in this vertical storage 110 therethrough. A rotatable tray 114 is disposed underneath the vertical storages 110, obstructively of their bottom openings 112. In some embodiments, each vertical storage 110 has a generally U-shaped cross-section defining a front wall 116, side walls 118 and a vertical slot 120 extending along the entire length of the vertical storage 110 and facing away from center of rotation of the rotatable tray 114. Advantageously, in one embodiment the blank 3D objects may be cubes or otherwise shaped crystals, each attached to a keychain, necklace or other projecting element, and may be stacked in the vertical storages 110 with the keychains projecting out through vertical slot 120. This configuration is useful to ensure that the keychains do not get tangled together or interfere with the loading and unloading process, as will be apparent further below. As will be further noted in FIG. 7, in the illustrated embodiment several vertical storages 110 are provided, contiguously disposed in an arced arrangement.

The rotatable tray 114 has a slit 122 therein sized to receive the lowermost one of the blank 3D objects from a given vertical storage 110. In the illustrated embodiment, the slit 122 extends radially from the outer edge of the rotatable tray 114, and is sized and shaped to generally confine the 3D objects laterally but not vertically. The rotatable tray 114 is computer controlled to rotate between different positions:

- an object-receiving position where the slit 122 is aligned with the bottom opening 112 directly underneath one of the vertical storages 110. The lowermost blank 3D object therein is therefore received in the slit 122. As will be readily seen in FIG. 7, a plate 124 extends parallely and closely underneath the rotatable tray 114, so that the 3D object may "slide" over the plate 124 as it is gripped by the slit 122 and guided by the rotation of the rotatable tray 114.
- a loading position where the slit 122 is positioned over the platform 94 (shown in FIG. 6). A first opening 126 extends through the plate 124 in alignment with the platform 94, so that the blank 3D object may slide off the plate 124 directly onto the platform 94. The blank 3D object is thus loaded on the platform. As mentioned above, the platform 94 moves up and down as the cube is being engraved, changing the distance between the cube and the laser optical components 92. In some embodiments, the cube remains laterally constrained within the slit 122 of the tray 144 during this vertical movement. Once this is done, the tray can continue its rotation, the now engraved 3D object sliding from the platform 94 onto the plate 124 on the other side of the first opening 126.
- The tray is then rotated to a delivering position where the slit 122 collaborates with the delivering device. In the illustrated embodiment, the delivering device is a drop chute 104, the plate 124 including a second opening 128 therethrough aligned with this drop chute 104. The engraved 3D object is simply guided by the slit over the plate 124 until it falls through the second opening 128.

As will be readily appreciated by one skilled in the art, the configuration above is particularly advantageous in embodiments where the 3D crystals are attached to keychains, necklaces or the like, as the keychains or other projecting elements can project radially outward of the tray 114 throughout the rotation of the tray without interfering with this movement or with other components of the system.

Figure 8:
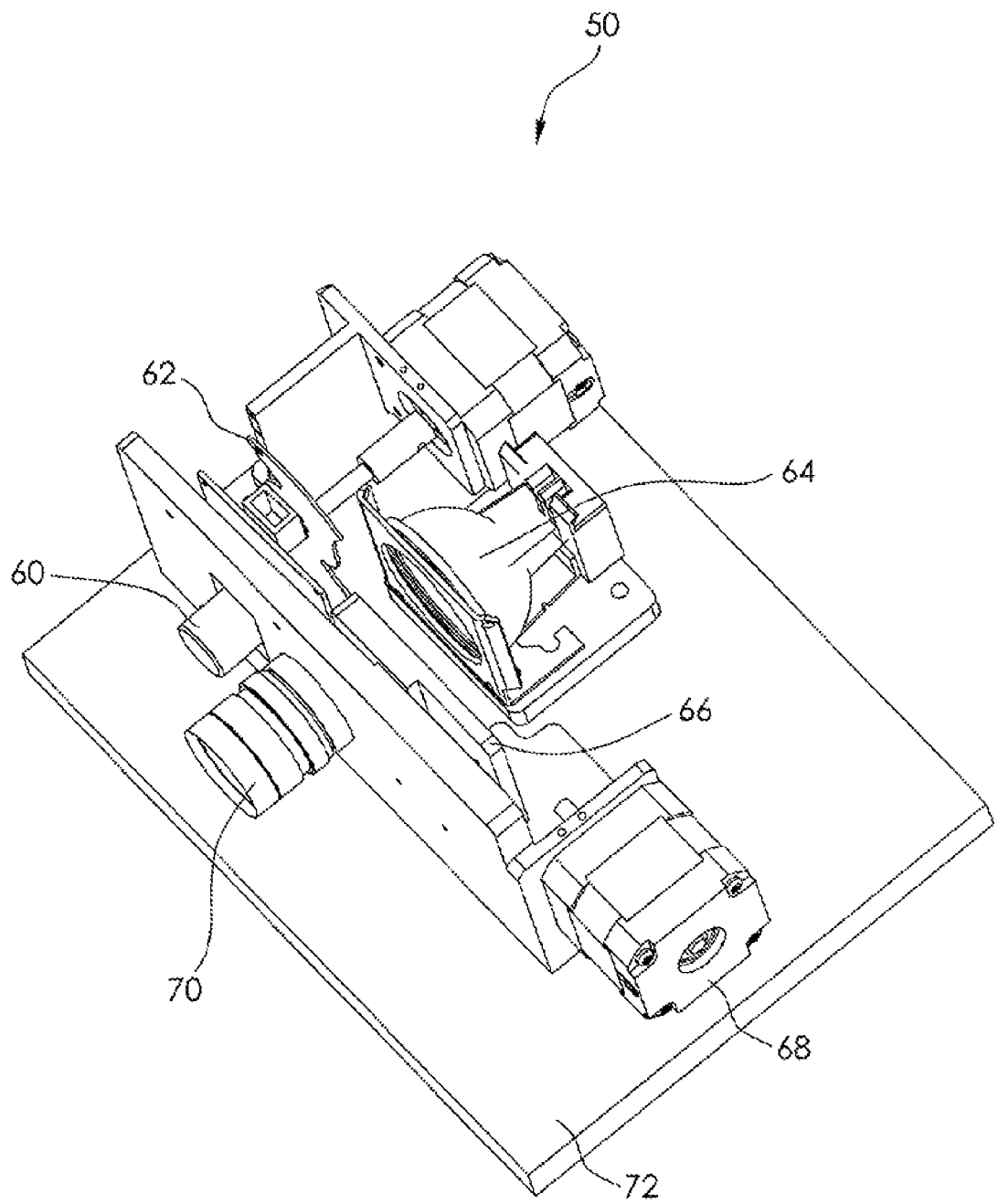
FIG. 8 is a perspective view of internal parts of the main enclosure shown in FIGS. 1 to 6.
Figure 9:
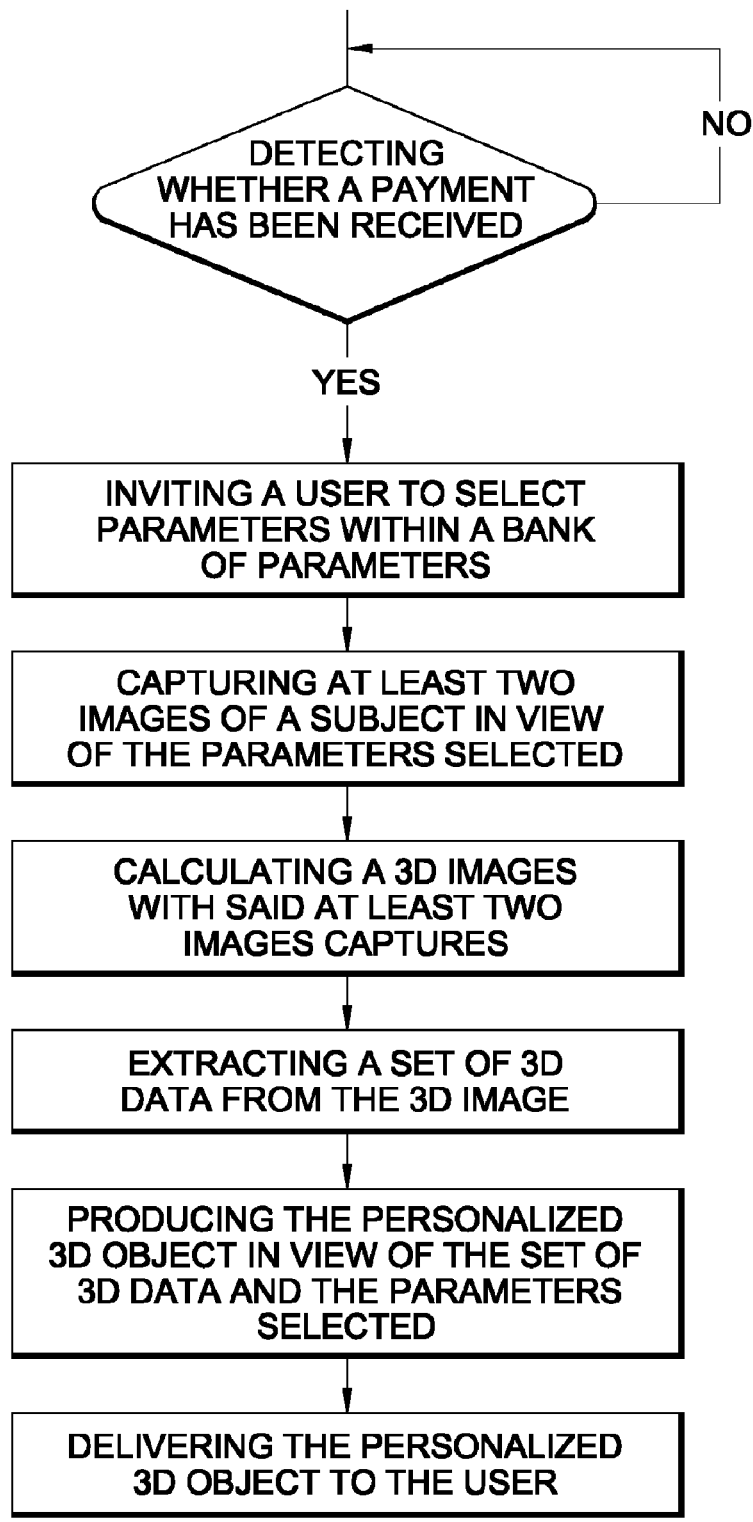
FIG. 9 shows a flow chart illustrating steps of a method for producing a personalized 3D object according to an embodiment.
Figure 10B:
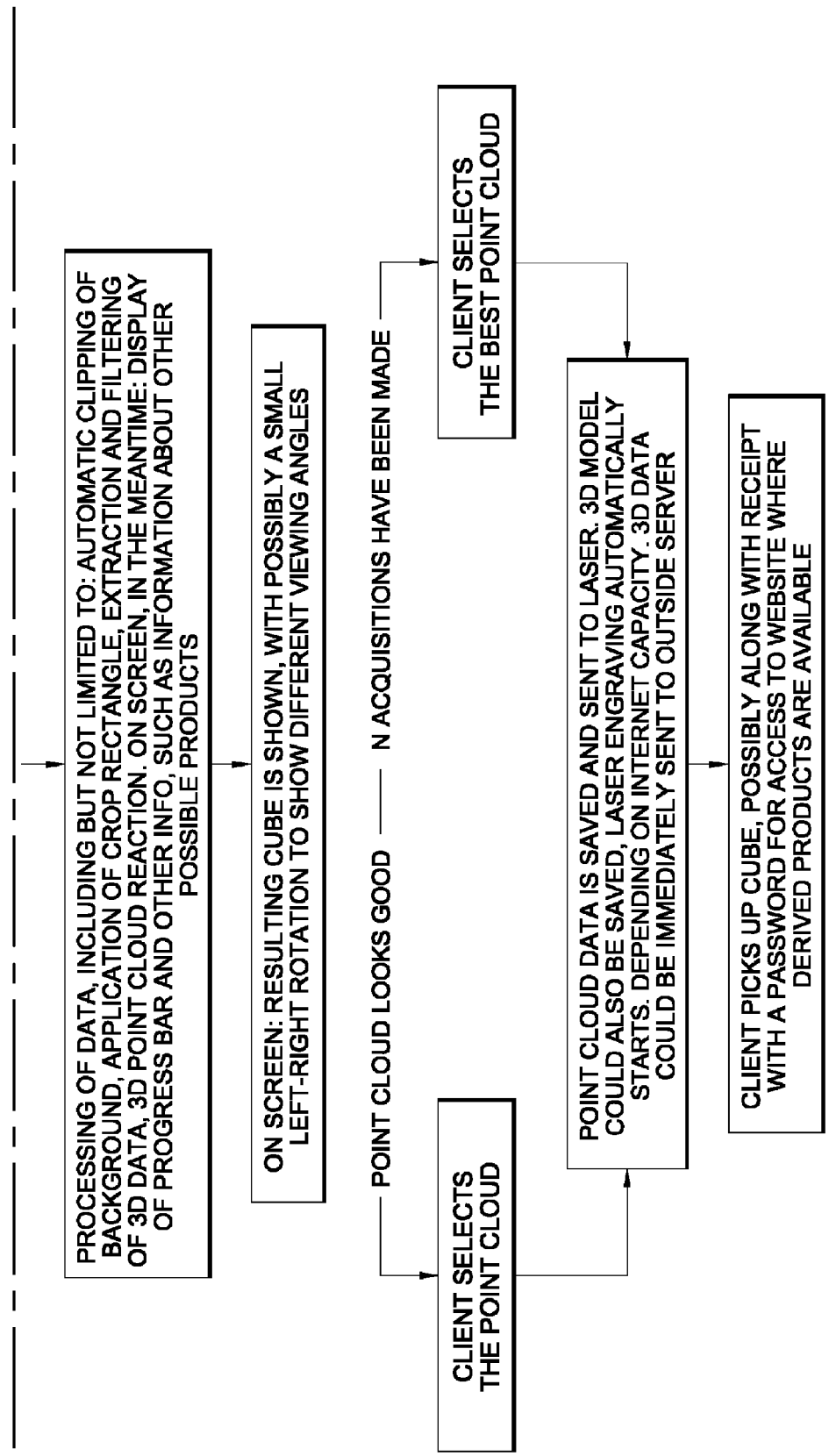
FIG. 10 shows a detailed flow chart illustrating steps of an embodiment of the method.

Now referring to FIGS. 1, 4 and 8, there is a possible design for the single order image acquisition system 50 with an extended non-ambiguity zone that is optionally installed in the kiosk. This image acquisition system 50, controlled by the main computer 80, could be, in another embodiment, either fixed or attached to some sort of positioning device, depending on the exact layout of the kiosk. In some embodiments, the image acquisition system 50 is fixed mount but this configuration must not be used as a limiting factor for the exact shape, size, connections, or functionalities of the chosen image acquisition system 50 which could vary. What an image acquisition system 50 must be capable of doing is taking the necessary images required to extract a 3D model, with color overlay, and this extraction must be doable without human interaction. An example of some of the components that may make up such an image acquisition system 50 comprises a projection system based on the projection of a moiré pattern on the subject, a shutter system 62, a camera 60 for the acquisition of the color images, lenses 70, a motor 68 and a slide support 66, all attached to a single main support 72. Other types of 3D acquisition systems could be based on stereovision or any other 3D acquisition technique known in the art.

Now referring to FIGS. 1, 3, 4, 8 and 9, software, installed on the main computer 80, performs some, all, or more, among the following instructions: controlling the image acquisition system 50, extracting the 3D data, controlling the manufacturing device and its many components for the cube positioning and delivery, controlling the laser 90 for the engraving process and controlling the displays 18, 30, the user input device 20, the payment detector 16, the additional illumination 32 and the cooling system.

The main computer 80 may be connected to an outside server and additional computers might also be used if necessary. The network connection can be achieved either through wireless or cable connections, the choice being dependent on what is available at the location where the kiosk is installed.

The server connected to the kiosk will be used, among other things, for storage of the 3D model data and color overlay. Additional information could also be stored, as deemed necessary, such as the 3D points cloud used for the original crystal cube engraving.

Referring now to FIGS. 1 to 10, a user wanting a personalized 3D object enters the kiosk. The user may want, as a subject, his face or bust digitized in 3D for obtaining his virtual 3D model engraved in a crystal which is in fact optical glass, or he may want to digitize another object or part of a living being. Upon entering the kiosk, the user is invited to make a payment and if a payment is received, he is invited to select different parameters and options for the 3D capture and the crystal-engraving, by means of a user input device 20 and a display 18. In the illustrated embodiment, the user input device 20 and the display 18 are comprised in the same apparatus which may be a flat LCD touch screen monitor. Among the parameters and options, but not limited to these, are: the type of crystal desired, for example a cube, a necklace, a key chain, etc.; and the orientation for the laser engraving, for example landscape or portrait, this nomenclature being used in the same context as with regular 2D still photographs.

According to some embodiments, once the user is ready for the 3D capture, a visual signal is emitted indicating the launch of the 3D image acquisition. The image acquisition system 50 is a non-contact color digitizer, based on the projection of moiré patterns onto the subject. The digitized has an extended non-ambiguity zone, covering a calibrated volume that extends to the panel 54 at the rear and to a distance at the front somewhere between the bench and the window 24. The exposure time of the camera 60 of the image acquisition system 50 is adjusted by turning on the projector and by illuminating the subject for a small amount of time. The live video of the subject is then projected on the display 18, so the position of the subject can be adjusted. The image acquisition system 50 captures four images, in view of the parameters and options previously selected. Each 3D capture takes a fraction of second and the 3D image is obtained through calculation techniques well documented and known in the art. The extraction of a set of 3D data from the 3D image is carried out by software running on the main computer 80. The following operations are done to the 3D image in order to obtain a 3D points cloud. It should be understood that the format of the data should not be limited to a point cloud, but include any kind of 3D data representation.

A method according to some embodiments, includes the steps of: localizing the background of the 3D image thanks to the panel of a uniform color placed behind the subject; clipping the background to produce a foreground 3D image; and applying a cropping shape, that may be selected by the user or automatically, to the foreground 3D image presented on the display as a texture mapped 3D model to produce a cropped 3D image. The method further comprises the step of producing a set of 3D data from the cropped 3D image, consisting of a 3D points cloud which is laser engravable. The 3D points cloud could be replaced by any mode of representation of data in 3D, which is readable by the selected manufacturing device.

In some embodiments, the set of 3D data is then used to compute a 3D image of the personalized 3D object. The user is then given the choice of either starting the production of the personalized 3D object, as shown on the display 18, or making another 3D capture. A limit of three 3D captures may be available. After the limit is reached the user is invited to select one of the proposed 3D images for producing the personalized 3D object.

Once the user has selected the set of 3D data to be used, the production of the personalized 3D object, in view of the parameters and options selected, can begin. Software running on the main computer 80 controls the hardware equipment necessary to produce the personalized 3D object. First, a loading and unloading device 98 loads a crystal onto an engraving platform 94. The set of 3D data are fed to the laser 90 which starts fabricating the personalized 3D object in view of the set of 3D data and the parameters and options selected by the user. The laser engraver 90 then starts the engraving process in the crystal cube. The computer 80, combined with the software, controls the laser engraver, which in turn, burns the points in different 3D locations inside the crystal cube. The arrangement of these points, within the cube, is what defines the image or portrait. When the engraving is done, the loading and unloading device 98 pushes the personalized 3D object further into a drop chute 104 which leads to the exit 106 thus delivering the personalized 3D object to the user. In addition, a receipt is optionally delivered to the user, the receipt comprising a website address, a randomly created password and a set of instructions for ordering additional products. The delivering device, including a drop chute 104 and an exit 106 in the illustrated embodiment, is designed in such a way that the engraved crystal and additional items, if appropriate, can be easily picked up. Other types of delivery mechanisms could be envisioned, for instance, a separate printer could print the receipt at the same time as the cube is being delivered.

In addition to the production of a personalized 3D object, the raw 3D images and the set of 3D data used for producing the personalized 3D object are transferred to a server via a network connection or stored temporarily on the computer in the absence of a sufficiently fast network connection. By visiting the website address printed onto the receipt and by using the password also printed onto the receipt, the user is able to access his data. The data is kept on the server for a predetermined number of days, possibly specified on the receipt. The data can be accessed for many purposes such as ordering customized products or downloading the data for personal use. A number of additional personalized products can be ordered from the website and the texture mapped 3D model can be used, with some additional generic or personal information (2D or 3D) added by the user through the website, for the production of actual or virtual goods such as other crystal engraved items, busts or other shapes printed through some type of 3D printing device, monochrome or color, that could be using gels, starch or other materials, lenticular prints, personalized dolls, bobble head dolls, stereoscopic photos, animated screen savers, 3D Stereo Portraits™, CAD/CAM busts, tombstones, decorative ornaments, plaques, jewelry, popular 3D files, avatars or personalized characters for videogames or for use in computer animations or for artistic purposes, etc.

The kiosk also has a self-promotion concept. An outside display 30 is used to either display a video sequence in a loop, showing a generic 3D image acquisition and sub-surface laser engraving process, or to display the 3D acquisition session currently under way. Also, during the different laps of time where the user is waiting upon data calculation or upon the engraving process to finish, the software can display promotional material on the display 18 located inside the kiosk. Among the tasks performed by the software, there is also having feedback mechanisms that could warn users and technicians of technical problems that could be encountered.

Mass consumption items could be made available for the user through the web site. The mass consumption item production process born from the 3D data collection process relates to all types of customizable products that can be produced thanks to the collected 3D data of each user. This new method consists in manufacturing the body part using rapid prototyping machines and then physically attaching/merging it to a prefabricated customizable/mass consumption item. Various embodiments encompass all types of rapid prototyping technology and all available material capable of producing the results. These customizable/mass consumption products can be either hard physical and tangible objects or soft objects such as virtual data. The mass fabricated items, before being customized, are "blanks", i.e., without customized option. These "blanks", for example bobble head dolls, can be mass-produced. To achieve production of a customized mass consumption item, one must physically manufacture the object thanks to the data obtained from the data collection step. The scanned 3D body parts can be produced by rapid prototyping technologies, like CNC milling machines. A CNC milling machine can literally carve the 3D body part out of a wide array of material like wax, wood, marble, Styrofoam® etc. Certain 3D printers can even produce the part in full color, which was impossible until recent advancements in that technology. If this technology is not available, the part can always be painted afterwards. The 3D objects such as customized heads can then be attached to the mass fabricated item. The subject's 3D face data is printed in 3D and then attached to a customizable mass consumption item, for example, a bobble head doll. The mass consumption item that was once generic is now customized. The item is thusly, endowed with the subjects "personality" and becomes a very attractive consumable item.

Advantageous results are attained because the method and apparatus for creating the personalized 3D object can be done without human intervention other than the users.

Numerous modifications could be made to the various embodiments which has just been described, without departing from the scope. Thus, for example, references have been made to photo kiosk, main enclosure, payment detector, display, user input device, bench, window, front door, door handle, secondary display, additional illumination, cooling vent, pump, fan, water reservoir, image acquisition system, panel of a uniform color, camera, shutter system, lamp, slide support, motor, lens, main support, main computer, secondary computer, server, network connection, laser, laser optical components, movable cube support, loading/unloading device, platform, motors for cube displacement, cube storage, drop chute, exit, etc. It has to be understood that the structures and geometrical configurations of the components described hereinabove are not essential to the invention and should not be taken in a restrictive way to limit the scope of this application. It would be clear for any person of the art that other components, other types of cooperation between the components as well as other geometrical configurations could be used.

What is claimed is:

1. An automated manufacturing device for producing a personalized 3D object in a blank 3D object in view of a set of 3D data and of parameters selected by a user, comprising:
    a platform for receiving the blank 3D object;
    a sub-surface laser engraver for altering the blank 3D object on said platform in view of the set of 3D data and the parameters selected by the user, thereby producing the personalized 3D object;
    a delivering device for delivering the personalized 3D object to the user; and
    a loading device for loading a blank 3D object onto the platform, said loading device comprising:
        At least one vertical storage for storing a plurality of said blank 3D objects in a vertically stacked arrangement, each vertical storage having a bottom opening allowing a lowermost one of the blank 3D objects in said vertical storage therethrough; and
        A rotatable tray disposed underneath said vertical storage obstructively of said bottom opening, the rotatable tray having a slit therein sized to receive the lowermost one of the blank 3D objects from said vertical storage, said tray being computer controlled to rotate between an object-receiving position where the slit is aligned with the bottom opening of one of the at least one vertical storage to receive the lowermost one of the blank 3D objects therein, a loading position where the slit is positioned over said platform to load the blank 3D object thereon, and a delivering position where the slit collaborates with the delivering device.

2. The automated manufacturing device according to claim 1, further comprising a plate extending closely underneath the rotatable tray, said plate having a first opening therethrough in alignment with said platform, and a second opening therethrough in alignment with the delivering device.

3. The automated manufacturing device according to claim 1, wherein said slit extends radially from an outer edge of the rotatable tray.

4. The automated manufacturing device according to claim 3, comprising a plurality of said vertical storages, contiguously disposed in an arced arrangement.

5. The automated manufacturing device according to claim 3, wherein each of the at least one vertical storage has a vertical slot extending along a length thereof and facing away from a center of rotation of said rotatable tray.

6. The automated manufacturing device according to claim 1, wherein the delivering device comprises a drop chute.

7. An apparatus for producing a personalized 3D object, comprising:
    a payment detector configured to detect whether a payment has been received;
    a user input device and a display configured to allow a user to select parameters within a bank of parameters when a payment is received;
    an image acquisition system configured to capture at least two images of a subject in view of the parameters selected by the user;
    a first calculator configured to calculate a 3D image with said at least two images captured;
    a second calculator configured to extract a set of 3D data from the 3D image; and
    an automated manufacturing device according to claim 1.

* * * * *